UNITED STATES PATENT OFFICE.

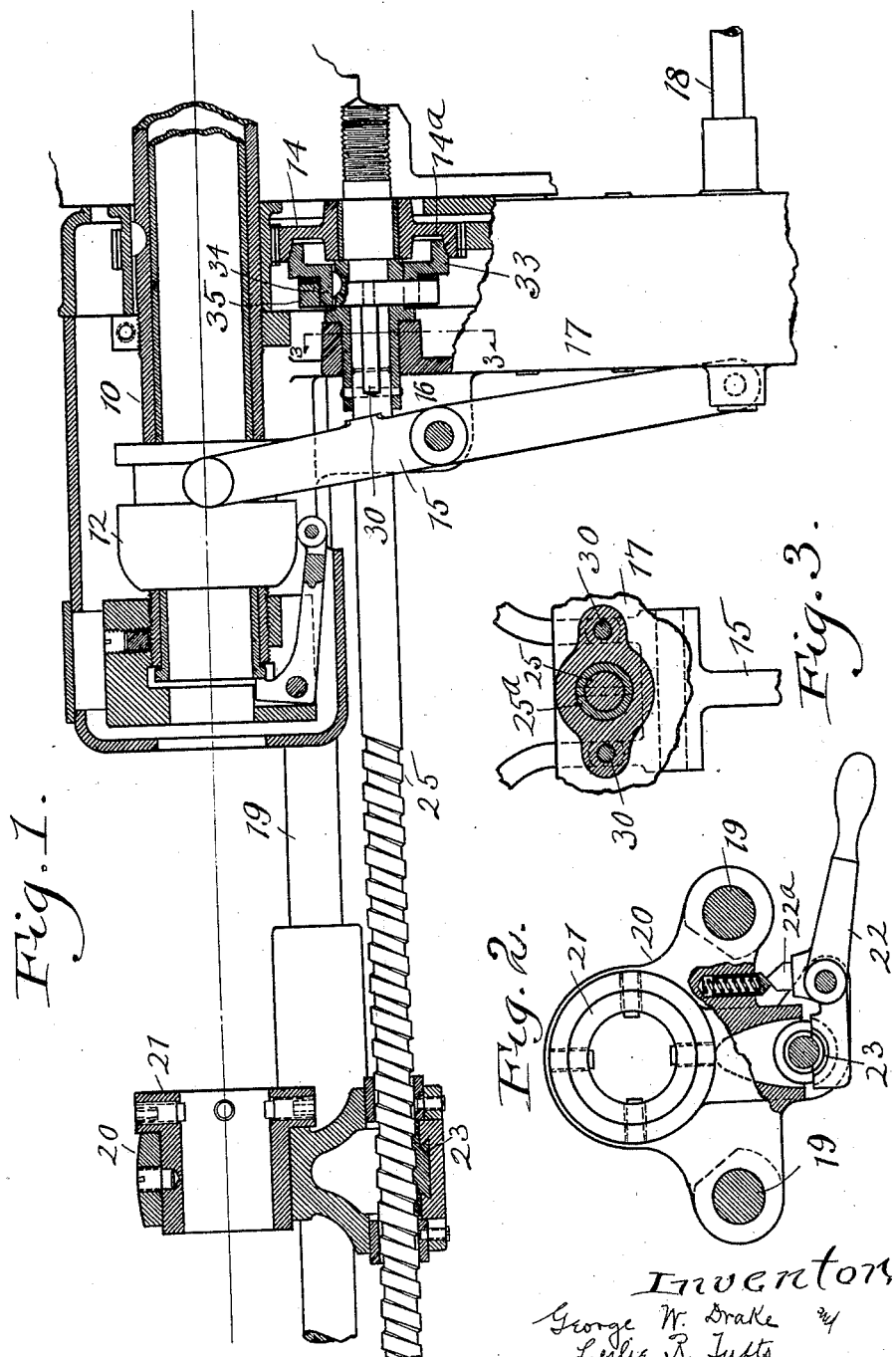

GEORGE W. DRAKE, OF CLEVELAND HEIGHTS, AND LESLIE R. TUFTS, OF CLEVELAND, OHIO, ASSIGNORS TO THE WARNER AND SWASEY COMPANY, OF CLEVELAND, OHIO, A CORPORATION OF OHIO.

STOCK-BAR-FEEDING MECHANISM.

1,402,748.

Specification of Letters Patent. Patented Jan. 10, 1922.

Application filed July 17, 1920. Serial No. 396,959.

*To all whom it may concern:*

Be it known that we, GEORGE W. DRAKE and LESLIE R. TUFTS, citizens of the United States, and residents, respectively, of Cleveland Heights, in the county of Cuyahoga and State of Ohio, and Cleveland, in the county of Cuyahoga and State of Ohio, have invented a certain new and useful Improvement in Stock-Bar-Feeding Mechanism, of which the following is a full, clear, and exact description.

This invention relates to novel means for mechanically feeding a stock bar from time to time through the tubular live spindle of a turret lathe and into the embrace of the chuck carried by said spindle; the chief object being to provide efficient and not expensive mechanism to insure an adequate feed movement of the stock bar whenever the chuck is open to receive said stock bar.

The invention consists in the construction and combination of parts shown in the drawings, hereinafter described and pointed out definitely in the appended claims.

In the drawings, Fig. 1 is a longitudinal central vertical section through the rear end of a turret lathe which is equipped with the present invention; Fig. 2 is an end view partly broken away of the stock bar feed slide, and Fig. 3 is a section in the plane of line 3—3 on Fig. 1.

Referring to the parts by reference characters, 10 represents the tubular live spindle of a turret lathe and 12 represents a cone which is slidably mounted on the spindle near the rear end thereof; the function of the cone being to cause the chuck (not shown) at the front end of the spindle to close its jaws on the stock bar which has been passed through the spindle from the rear end thereof. Those familiar with this art will understand that by sliding this cone rearward the chuck jaws will be closed by mechanism which is well known; and that by sliding it forward to the position shown the chuck jaws will be allowed to open to release that part of the stock bar which the chuck had gripped and to permit the stock bar to be pushed forward in the spindle so that the chuck can clamp another part of said stock bar. As shown, the cone is moved backward and forward by a fork lever 15 pivoted to an ear 16 on the gear box 17.

The lever may be rocked by any suitable means, although it is common to connect it with an endwise sliding rod 18 which is extended to some distant point where the operator of the machine may conveniently take hold of it and move it.

The spindle rotates a train of gears in the gear box 17 in the usual way, the gear 14 hereinafter referred to being one member of that gear train.

The stock bar feed slide 20 is slidably mounted on two fixed guide bars 19. This feed slide carries a tubular bushing 21 which is alined with the tubular spindle. The stock bar (not shown) goes through this bushing and is fixed therein by some suitable means. To the extent thus far described the mechanism as shown is conventional, and common in turret lathe construction.

The present invention relates to the means whereby the stock bar feed slide is moved toward the spindle to push the stock bar through the spindle whenever the chuck jaws are open. To effect this result the feed screw 25 is employed, and this is rotatably mounted in suitable bearings, one only of which is shown, namely, a bearing in the rear wall of the gear box, in axial alignment with the gear 14 before referred to. This feed screw is parallel with and below and midway between the two guide bars 19. To the lower side of this stock bar slide 20 a lever 22 is pivoted, and this carries a half nut 23 for engagement with the feed screw. A wedge pin 22ª fixed to said lever engages a spring actuated wedge plunger 24, the action of which is to hold the lever in either its operative position as shown, or in an inoperative position to which it will be carried by the upward movement of the lever handle.

The gear 14 referred to is constructed with a conical recess 14ª so that it may become one member of a cone friction clutch. The other member 33 of said friction clutch is mounted on and has a sliding tongue and groove connection with the feed screw within the gear box. In the specific construction shown, there is a sleeve 25ª rotatively mounted in the outside wall of the gear box 17. The feed screw 25 goes into this sleeve and is pinned thereto. The clutch member 33 is slidably mounted on the sleeve 25ª within the gear box having a tongue and groove driving connection therewith. By pushing the conical clutch member 33 to the right, as shown, it will frictionally engage the conical clutch surface on the constantly rotating gear 14 and thereby compel the rotation of the feed screw. The clutch member 33 has a hub 34 on which a pressure collar 35 is rotatably mounted. Two pins 30 fixed to this pressure collar are slidably supported in the end wall of the gear case 17 and they project out therefrom to positions where their ends are in the path of the fork arms of the lever 15.

When the lever 15 is rocked (to the right as shown in Fig. 1) to move the cone 12 to the chuck releasing position, it will engage these pins 30 and cause the ring by which they are carried to press the clutch cone 33 into frictional engagement with the cone recess on the gear 14. The screw will thereby be rotated in that direction which will cause the stock bar slide to move toward the spindle, and thereby push the stock bar through the spindle and into the embrace of the chuck thereon. Those familiar with this art will understand that when the stock bar has been pushed forward far enough its front end will engage a stop which prevents further movement, this being ordinary turret lathe construction. When the forward movement of the stock bar is so stopped the cone clutch member 33 will slip relatively to the clutch member 14 after the fashion of friction clutches until the operator moves the lever 15 in the chuck opening direction. He is however expected to do this as soon as the feeding movement of the stock bar is stopped, wherefore the clutch member 33 will be allowed to release itself from gear 14; and therefore there will be very little of this frictional slipping.

It will be understood that the mechanism shown may be varied as to details to a very considerable extent without departing from the spirit of the invention, and that the appended claims are intended to cover not only the specific construction shown, but any construction which embodies the combinations of parts recited in said claims.

Having described our invention, we claim:—

1. In a turret lathe, the combination of a stock bar feed slide, a feed screw for moving the slide, a friction clutch for connecting and disconnecting said feed screw and a rotating member of the turret lathe mechanism, a sliding cone for actuating the spindle chuck of said lathe, a lever for moving said cone, and means which extend into the path of said lever for closing said friction clutch.

2. In a turret lathe, the combination of a rotary spindle, a train of gears rotated by said spindle, one of said gears being constructed to serve as one member of a cone friction clutch, a stock feed slide, a feed screw for moving it which feed screw is mounted in axial alignment with the gear above mentioned, a friction clutch cone for co-operating with the clutch cone on said gear having a sliding tongue and groove connection with said feed screw, a sliding cone for operating the spindle chuck, a lever engaging said cone to operate it, and means extending into the path of said lever for moving the sliding clutch member in the clutch closing direction.

3. In a turret lathe, the combination of a stock feeding slide, a feed screw for operating the same, a clutch member connected with a rotating part of the turret lathe mechanism, a co-operating clutch member having a sliding tongue and groove connection with said feed screw, a pressure collar rotatably mounted on the hub of the last named friction clutch member, a pin carried by said collar and slidably mounted in a part of the fixed frame work of the machine, and a lever engaging with projecting ends of said pins.

4. In a turret lathe, the combination of the sliding chuck operating cone, an operating lever therefor, a stock bar feed slide, a feed screw for operating said slide, a friction clutch for connecting said feed screw with a rotatable member of the turret lathe mechanism, means for closing said clutch which means include a pin slidably mounted in a fixed part of the turret lathe and extended to a point where they will be in the path which the chuck cone operating lever must move as it moves the cone in the chuck releasing direction whereby the clutch will be closed as the chuck is released.

In testimony whereof, we hereunto affix our signatures.

GEORGE W. DRAKE.
LESLIE R. TUFTS.